United States Patent [19]
Tazai

[11] Patent Number: 5,896,777
[45] Date of Patent: Apr. 27, 1999

[54] CONTROL LEVER FIXING MECHANISM

[75] Inventor: Akira Tazai, Aichi-gun, Japan

[73] Assignee: Mannoh Kogyo Co., Ltd., Japan

[21] Appl. No.: 08/908,163

[22] Filed: Aug. 7, 1997

[30] Foreign Application Priority Data

Aug. 9, 1996 [JP] Japan ................................. 8-210895

[51] Int. Cl.⁶ ............................ B60K 20/00; G05B 1/00; B25B 3/18
[52] U.S. Cl. .................. 74/473.1; 74/473.15; 74/473.31; 74/470; 403/321
[58] Field of Search ............................. 74/473.15, 473.31, 74/470, 473.13, 473.14; 403/321, 300, 383, 322.1, 322.2, 322.3, 322.4

[56] References Cited

U.S. PATENT DOCUMENTS

| | | |
|---|---|---|
| 2,216,314 | 10/1940 | Gustafson .................... 74/473.31 X |
| 4,934,208 | 6/1990 | Carlstrom ..................... 74/473.15 |
| 4,936,431 | 6/1990 | Shinpo ......................... 192/4 A |
| 5,027,673 | 7/1991 | Behrens et al. ................. 74/470 X |

*Primary Examiner*—Charles A. Marmor
*Assistant Examiner*—Brandon C. Stallman
*Attorney, Agent, or Firm*—Parkhurst & Wendel

[57] ABSTRACT

In a control lever fixing mechanism, a shift lever and a shaft are inserted into through-holes of two side plates of a control lever. A lockup plate is inserted into a space defined by the two side plates of the control lever. The control lever and the shift lever are pulled upward by screwing a nut to a bolt of the control lever from the outside of the control lever. Thereby, the shift lever, the shaft and the control lever are brought into close contact with one another and fixed firmly as a unit, preventing angle deviation relative to each other.

13 Claims, 7 Drawing Sheets

CONTROL LEVER FIXING MECHANISM

BACKGROUND OF THE INVENTION

The present invention relates to a control lever fixing mechanism employed in an automotive column automatic transmission (AT) shift lever device.

DESCRIPTION OF THE RELATED ART

In conventional column AT shift lever devices, a turning movement of the shift lever is transmitted to a control lever to operate a control cable. In a column AT shift lever device in which the control lever is disposed coaxially with the shift lever, there is a requirement that the control lever be firmly fixed to the shift lever so that an angle deviation will not occur between the shift lever and the control lever.

To meet this requirement, the control lever and the shift lever are conventionally formed into a single unit by casting or the like. However, this art has a problem in that the entire size is increased and, therefore, the weight is increased, in order to achieve a necessary strength. To solve the problem, a control lever fixing mechanism has been developed as shown in FIG. 7 wherein a base portion of a control lever 51 is split into two portions that are connected by a bolt 54 after a shift lever 52 and a shaft 53 are inserted between the split portions. However, the mechanism shown in FIG. 7 has problems in that the connection of the split portions of control lever 51 by bolt 54 requires additional torque because a portion of the surface of the shaft 53 is without support, increasing the possibility of slippage, herein referred to as fastening torque. Thus, the abutting surfaces of the control lever 51 and the shaft 53 are not stable. Moreover, a mechanism wherein the control lever is fastened simply from the outside as shown in FIG. 7, is not able to solve the problem of an unstable requirement of fastening torque, and unstable abutting surfaces, even if the abutting surfaces of the control lever 51 and the shaft 53 have non-circular sectional shapes.

SUMMARY OF THE INVENTION

Accordingly, it is an object of the present invention to provide a control lever fixing mechanism that solves the above-stated problems of the conventional art and makes it possible to fix firmly a control lever to a shift lever with stable abutting surfaces, and stable fastening torque, to prevent angle deviation of the control lever.

According to one aspect of the present invention, there is provided a control lever fixing mechanism including a shift lever whose base portion outer surface has a non-circular sectional shape, a hollow shaft having a portion of its internal surface complementary in shape to the non-circular sectional shape of the outer surface of the shift lever fitted over a portion of the shift lever, and a control lever having a bottomless space defined between at least two side plates which are perpendicular to the axis of the shaft, the shaft extending through through-holes for the shaft. An upper inner surface of each of the through-holes includes a flat surface portion corresponding to an exterior shape of the shaft. A lockup plate is inserted into the space of the control lever from a bottom portion thereof. The lockup plate moves the shift lever upward toward an upper portion of the space and thereby causes the shift lever to contact closely the shaft and causes the shaft to contact closely the flat surface portions of the through-holes in the control lever.

The hollow shaft may have a non-circular sectional-shape portion in each of an inner surface and an outer surface of the shaft.

The control lever fixing mechanism may further have a construction wherein an inner peripheral surface of the shaft has a non-circular sectional shape complementary in shape to the base portion outer surface of the shift lever, and wherein an outer peripheral surface of the shaft has a non-circular sectional shape, and an upper right side surface of the outer peripheral surface of the shaft and an upper left side surface of the outer peripheral surface of the shaft include flat surface portions that are substantially symmetrical.

The base portion outer surface of the shift lever may include an upper flat surface, a lower right side flat surface and a lower left side flat surface.

The lockup plate may be caused to move the shift lever upward by screwing a nut to a bolt, also referred to as a threaded shaft, provided in an upper portion of the lockup plate, from outside of the control lever. The lockup plate may comprise an annular body and said bolt provided integrally with an upper portion of the annular body. A bottom portion of the lockup plate may directly contact a bottom surface of the shift lever.

An upper inner surface of each of the through-holes may include substantially symmetrical flat surface portions corresponding to an exterior shape of the shaft.

According to another aspect of the present invention, there is provided a control lever fixing mechanism including a shift lever whose base portion outer surface has a non-circular sectional shape, a hollow shaft having a portion of its internal surface complementary in shape to the non-circular sectional shape of the outer surface of the shift lever fitted over a portion of the shift lever and having a non-circular sectional-shape portion in each of an inner surface and an outer surface of the shaft, and a control lever having a bottomless space defined between at least two side plates that have through-holes for the shaft. An upper inner surface of each of the through-holes includes a flat surface portion corresponding to an exterior shape of the shaft. A lockup plate has a bolt provided in an upper portion of the lockup plate. A nut is screwed to the bolt from outside of the control lever so as to pull the shift lever into close contact with the shaft and pull the shaft into close contact with the flat surface portions of the control lever.

A base portion of the shift lever may be rotatably supported by a retainer with the shaft disposed therebetween, the retainer being mounted near a steering column by a shaft.

A relatively large portion of an outer surface of the shaft may be a substantially cylindrical surface.

The control lever may be rotatable coaxially with the shift lever.

A control cable may be connected to an end portion of the control lever for a shift operation of an automatic transmission.

In this specification, a direction in which the control lever is projected is termed the upward direction, and the opposite direction is termed the downward direction, for convenience in description.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION

A preferred embodiment of the present invention will be described in detail hereinafter with reference to the accompanying drawings.

It should be understood that the drawings and accompanying description of the preferred embodiments of the present invention are described for a shift lever device for location on a steering wheel column mounted shift on the left side of the column, as typically would be done in right-side driven vehicles for use in Japan or the United Kingdom, for example. It will be understood that for such mechanisms for left-side driven vehicles, as typically used in the United States, for example, that the parts of the inventive shift lever devices would be mirror images of the devices as shown and described herein.

Figure 1:
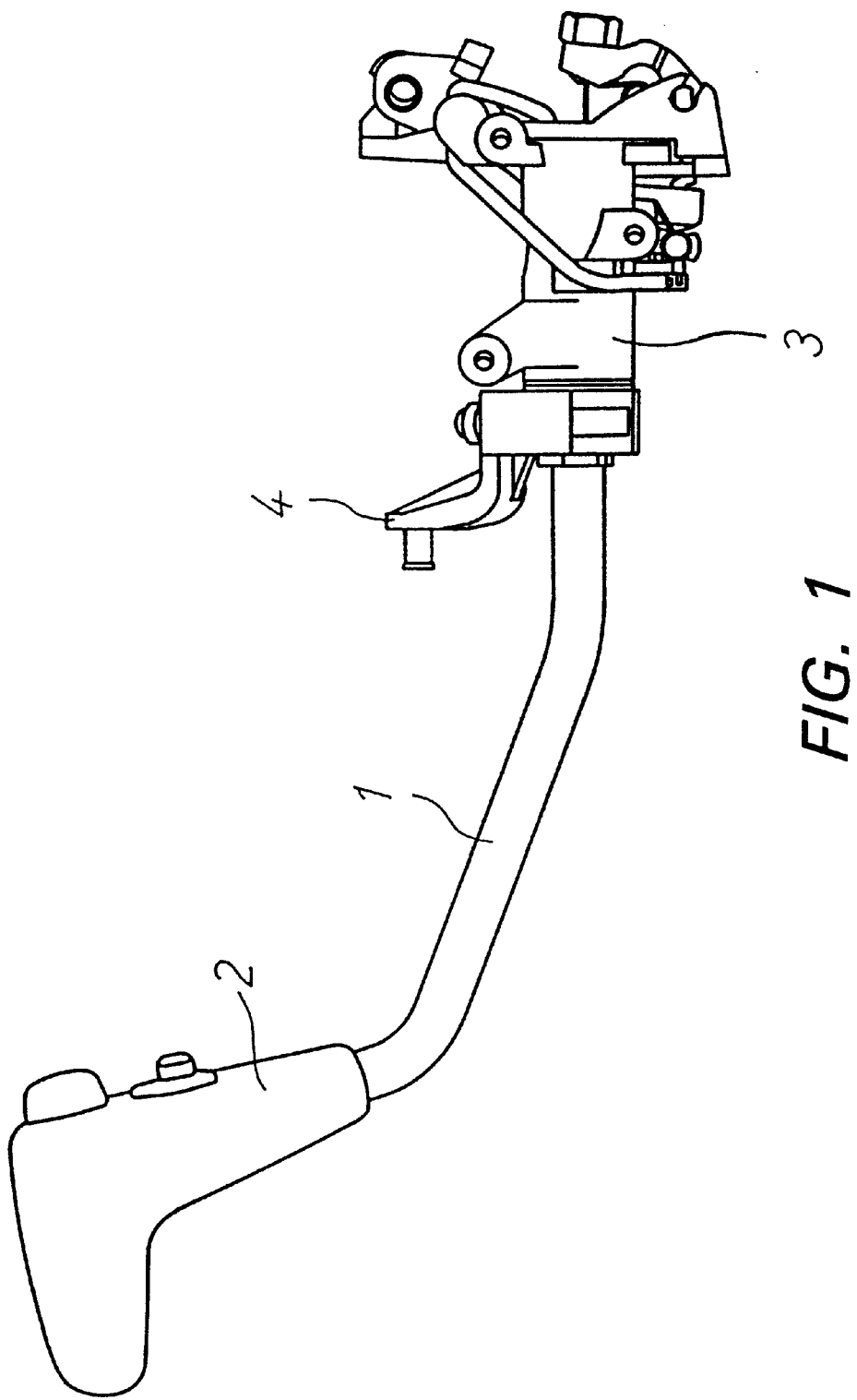
FIG. 1 is an elevation of an entire column AT shift lever device incorporating a preferred embodiment of the present invention.
Figure 2:
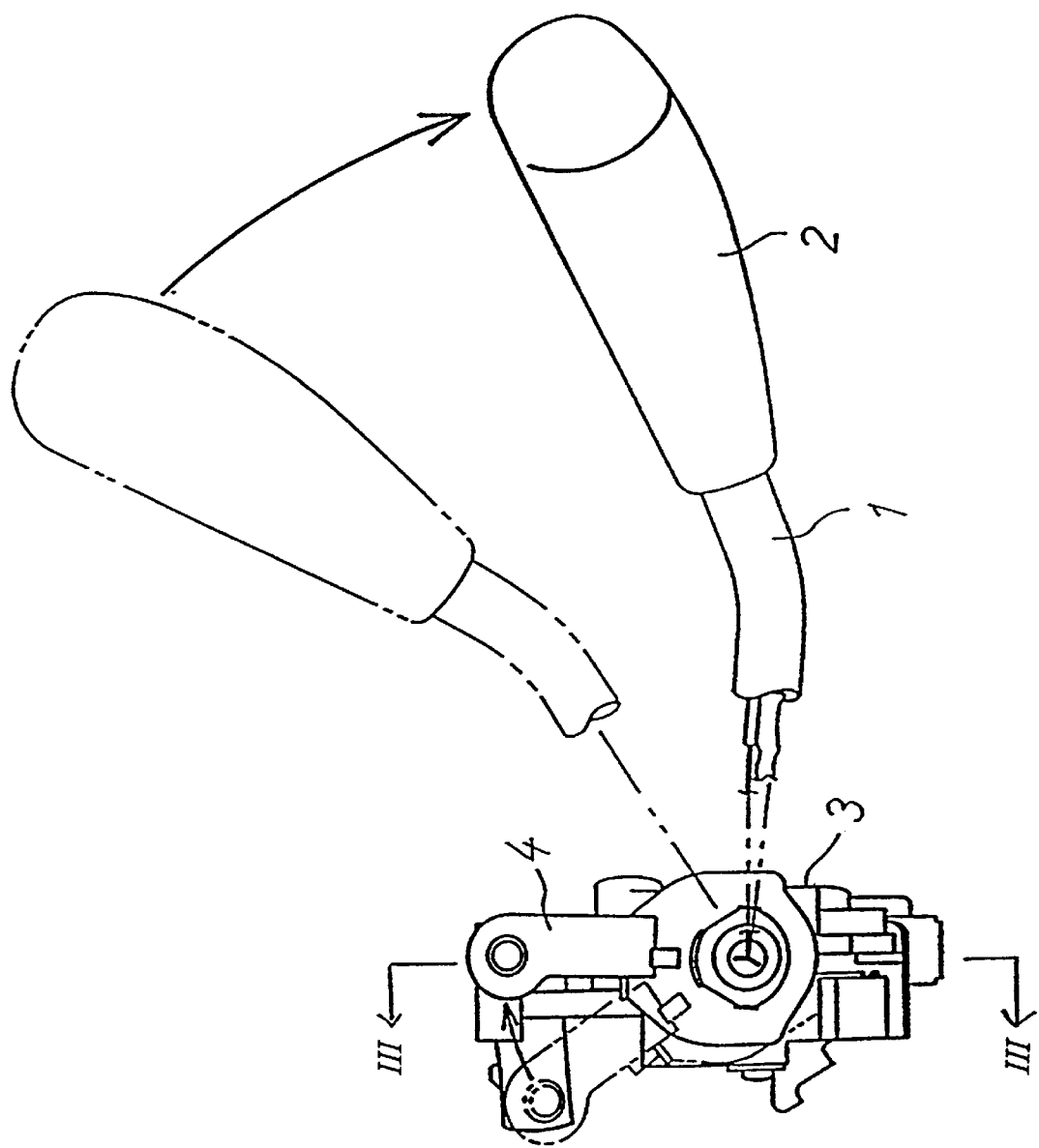
FIG. 2 is a left side view of the column AT shift lever device shown in FIG. 1.

A column AT shift lever device incorporating a control lever fixing mechanism according to a preferred embodiment will first be described with reference to FIGS. 1 and 2. A shift knob 2 is provided on a distal end of a shift lever 1. A base portion of the shift lever 1 is rotatably supported by a retainer 3. The retainer 3 is mounted near a steering column. A control lever 4 is connected so as to turn on the same axis as the shift lever 1 when the shift lever 1 is turned as indicated in FIG. 2. A control cable (not shown) is fixed to a distal end of a control lever 4, for shift operations of an automatic transmission.

Figure 3:
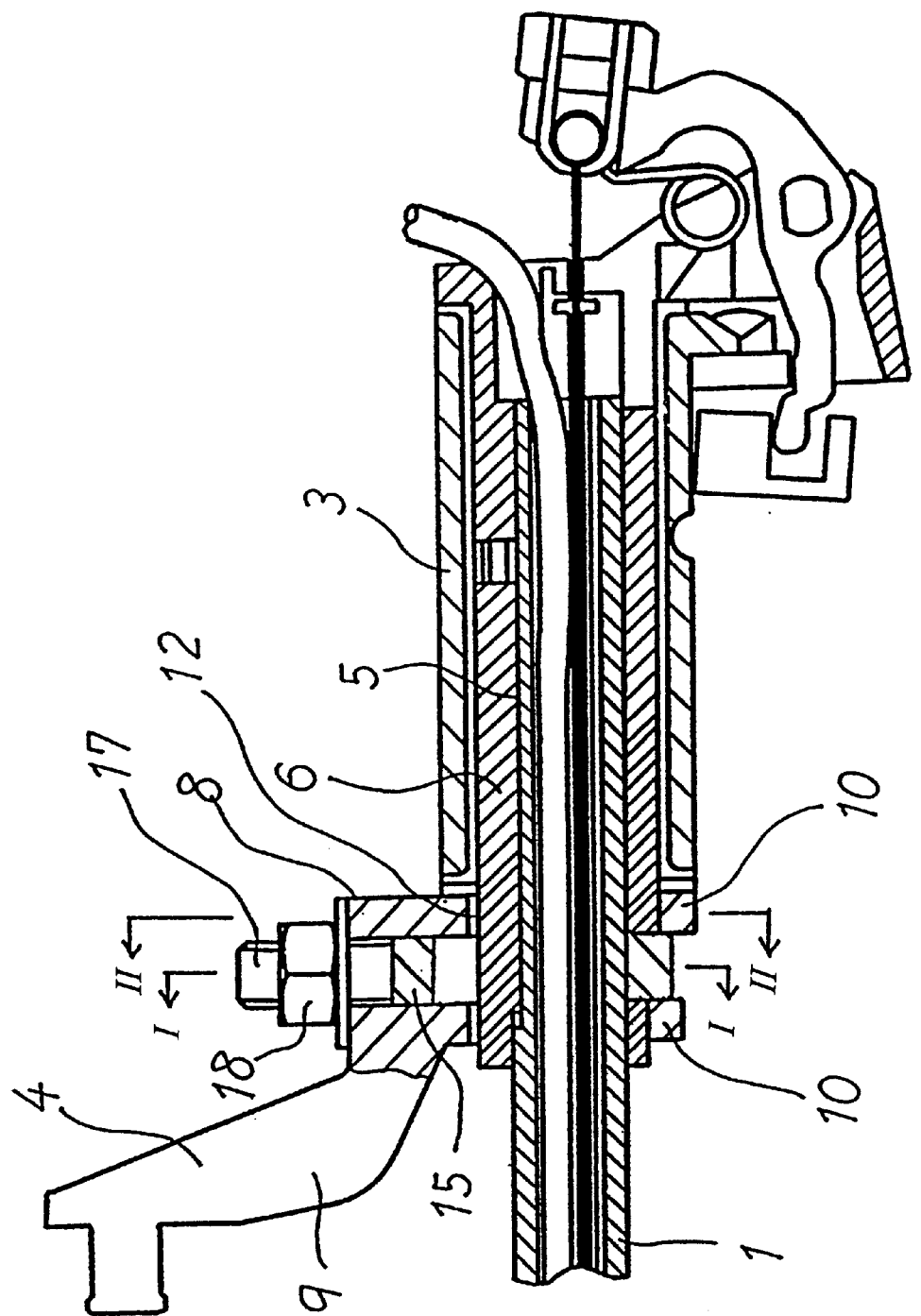
FIG. 3 is a central longitudinal sectional view of portions of a control lever fixing mechanism shown in FIG. 1 according to a preferred embodiment.
Figure 4:
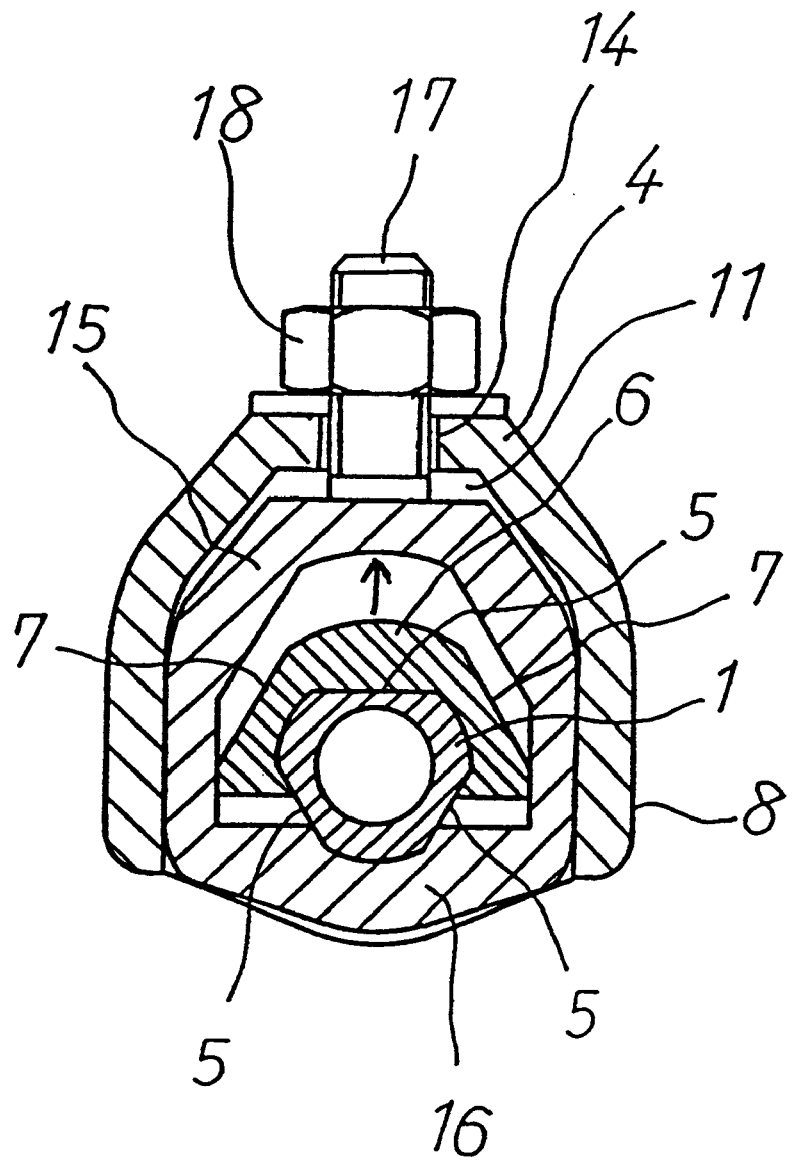
FIG. 4 is a sectional view of the control lever fixing mechanism taken on plane I of FIG. 3.
Figure 5:
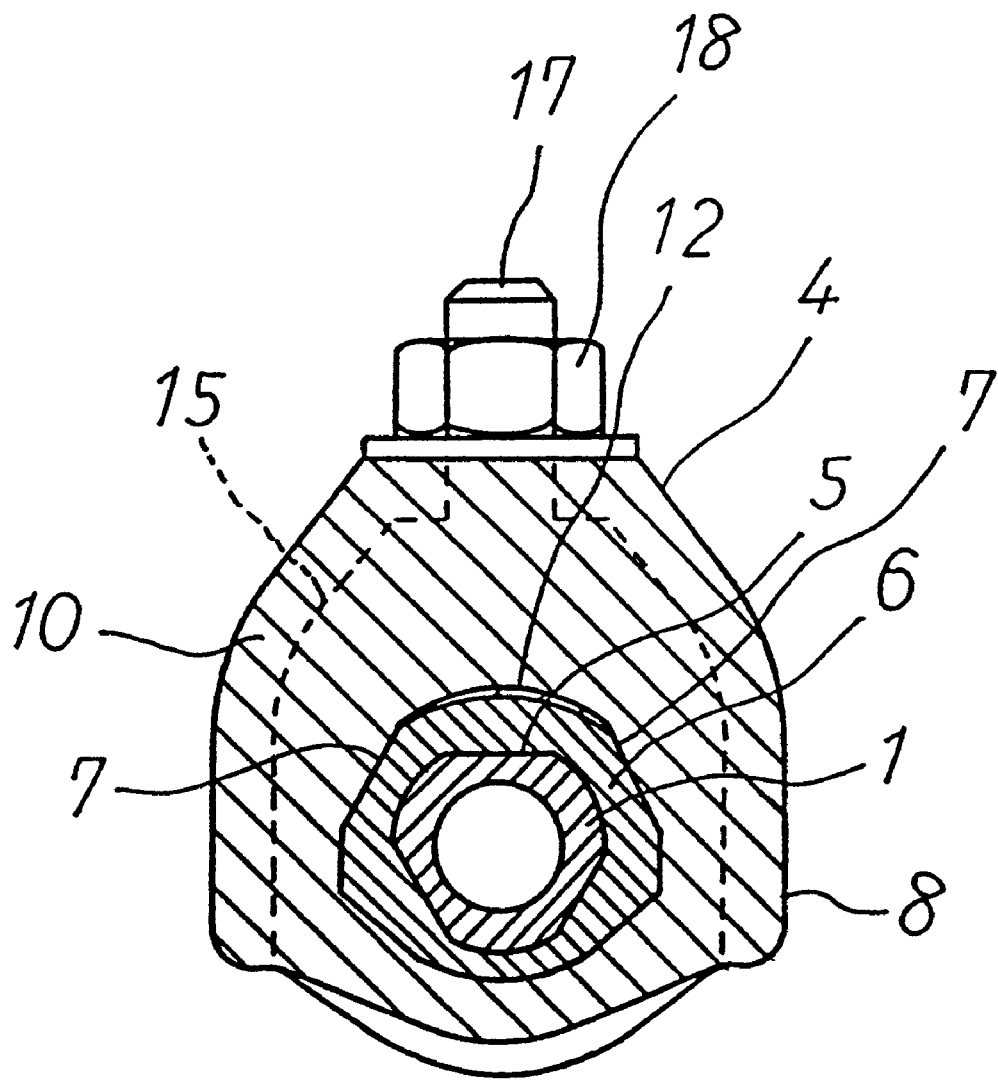
FIG. 5 is a sectional view of the control lever fixing mechanism taken on plane II of FIG. 3.
Figures 6A, 6B, 6C:
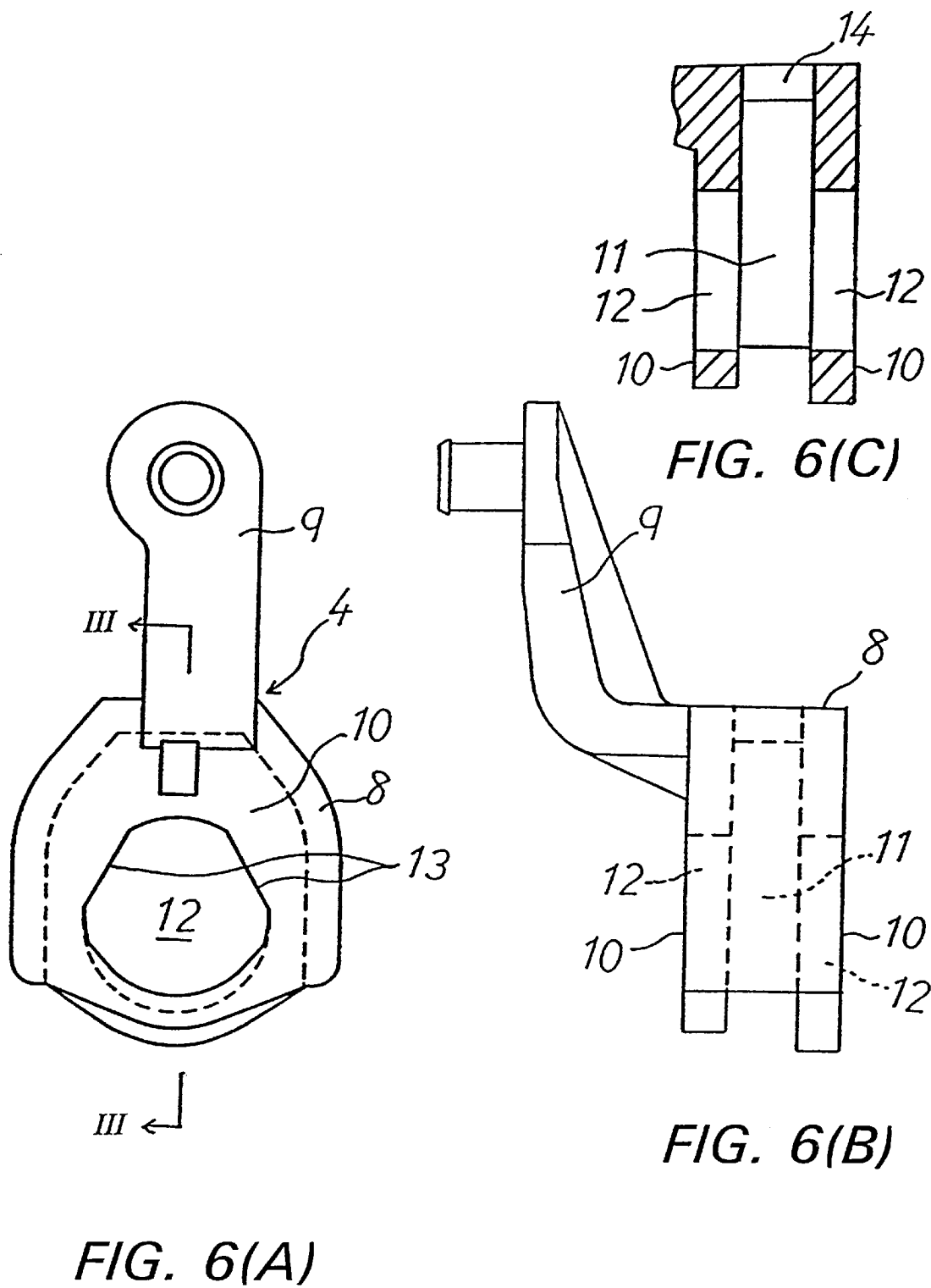
FIG. 6(A) is an elevational view of a control lever.
FIG. 6(B) is a side view of the control lever.
FIG. 6(C) is a sectional view of the control lever taken on plane III of FIG. 6(A)
Figure 7:
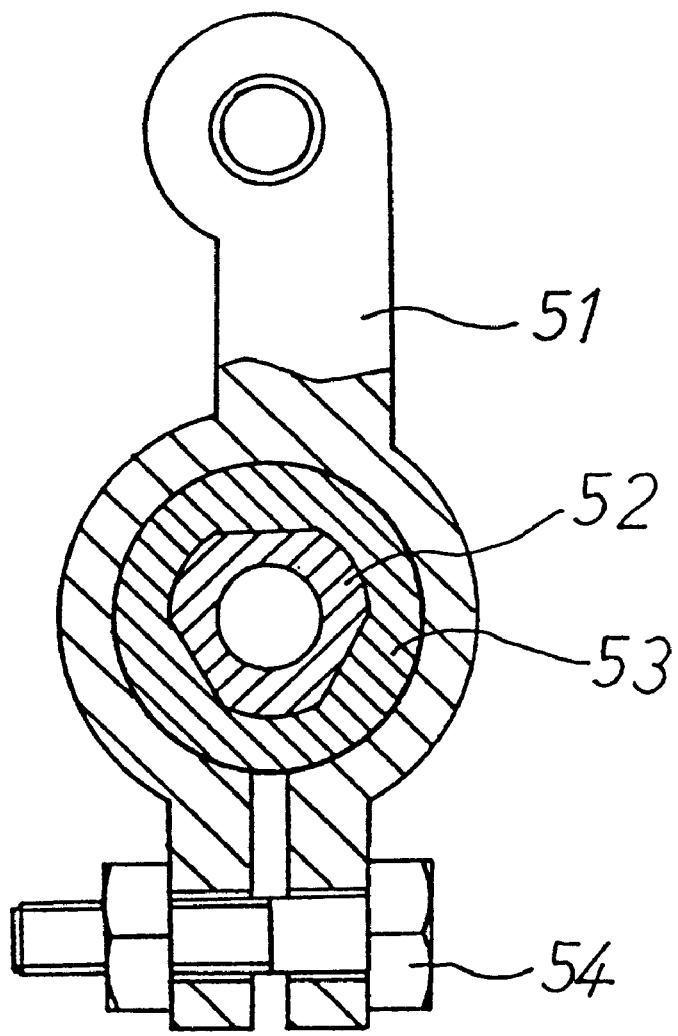
FIG. 7 is a sectional view of a conventional prior art control lever fixing mechanism.

A control lever fixing mechanism according to this embodiment will be described with reference to FIGS. 3–5 and 6(A)–6(C). FIG. 3 is a central longitudinal sectional view of portions of a control lever fixing mechanism according to the embodiment. FIG. 4 is a sectional view thereof taken on plane I of FIG. 3, and FIG. 5 is a sectional view taken on plane II of FIG. 3. FIGS. 6(A)–6(C) illustrate a shape of a control lever 4 alone, wherein FIG. 6(A) is an elevated view thereof, FIG. 6(B) is a side view, and FIG. 6(C) is a sectional view taken on plane III of FIG. 6(A).

An outer surface of a base portion of the shift lever 1 is formed as a non-circular shape in section, as shown in FIGS. 3–5. In this embodiment, an upper surface and right and left lower surfaces of the shift lever 1 are shaped as flat surfaces 5 as shown in FIG. 4. A hollow shaft 6 is fitted onto an outer surface of the base portion of the shift lever 1. An inner surface of the hollow shaft 6 is formed as a non-circular shape in section corresponding to the outer surface of the base portion of the shift lever 1 as shown in FIG. 4. The shaft 6 closely contacts substantially the entire length of the upper flat surface 5 of the shift lever 1.

The outer surface of the shaft 6 is formed primarily as a cylindrical surface. The shaft 6 is rotatably supported by the retainer 3 as shown in FIG. 3. However, in locations of the sectional view of FIG. 4 taken on plane I of FIG. 3 and the sectional view of FIG. 5 taken on plane II of FIG. 3, the outer surface of the shaft 6 is formed into a non-circular shape in section. In particular, right and left side outer surfaces of an upper portion of the shaft 6 are formed as flat surfaces 7 symmetrically inclined. In the location of the plane I sectional view of FIG. 4, the shaft 6 has a shape wherein a lower half portion is eliminated.

According to this embodiment, the aforementioned component parts are combined with a lockup plate 15 for actual use. The lockup plate 15 is inserted into the bottomless space 11 of the control lever 4 from the bottom thereof as shown in FIG. 4. The lockup plate 15 is formed of an annular body 16 and a bolt 17 formed together with or firmly connected to an upper portion of the body 16. The annular body 16 is designed so that the shift lever 1 and the shaft 6 can be inserted into the annular body 16, and so that a bottom portion of the annular body 16 directly contacts a bottom surface of the shift lever 1. The bolt 17 of the lockup plate 15 is inserted into the enlarged bolt insert hole 14 of the control lever 4, and a nut 18 is screwed thereto from the outside of the control lever 4.

The operation of the control lever fixing mechanism according to this embodiment will next be described.

The control lever fixing mechanism is assembled by inserting the lockup plate 15 into the bottomless space 11 of the control lever 4, and then inserting the shift lever 1 and the shaft 6 into the lockup plate 15. Screwing and tightening the nut 18 to the bolt 17 of the lockup plate 15 creates force which pulls the lockup plate 15 upward to the control lever 4 as indicated by the arrow in FIG. 4.

As a result, the lockup plate 15 directly contacts the bottom portion of the shift lever 1 and pulls the shift lever 1 upward. Simultaneously, the shift lever 1 and the shaft 6 are brought into close contact with each other on the flat surfaces 5 as shown in FIG. 4, and thereby firmly connected as a unit. Therefore, the three component parts, that is, the shift lever 1, the shaft 6 and the lockup plate 15, are firmly fixed so that no rotation occurs relative to one another.

In the location of the section shown in FIGS. 5 and 6(A) the aforementioned force pulling the lockup plate 15 upward to the control lever 4 pulls the shaft 6 upward to the control lever 4, bringing the symmetrical flat surface portions 13 formed in the through holes 12 of the control lever 4 into close contact with the non-circular outer surface of the shaft 6. The control lever 4 is thereby firmly fixed to the shift lever 1 and the shaft 6. Therefore, the position of the control lever 4 at the time of a shift of the shift lever 1 to the parking position or the like can be precisely defined.

As understood from the above description, in the control lever fixing mechanism according to this embodiment, the lockup plate 15 and the shift lever 1 are pulled upward by tightening the nut 18 so that the shaft 6 closely contacts the flat surface portions 13 of the control lever 4. Thereby the entire mechanism is assembled firmly as a unit. Therefore, the abutting surfaces of the control lever 4 and the shaft 6 become stable and the fastening torque on the nut 18 is stabilized. Furthermore, since the control lever 4 can be produced separately from the shift lever 1 and the shaft 6, there is another advantage in that the weight can be reduced compared with the conventional art wherein the entire mechanism is cast as a unit.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements included within the spirit and scope of the appended claims.

What is claimed is:

1. A control lever fixing mechanism comprising:

a shift lever whose base portion outer surface has a non-circular sectional shape;

a hollow shaft having a portion of its internal surface complementary in shape to the non-circular sectional shape of the outer surface of the shift lever fitted over a portion of the shift lever;

a control lever having a bottomless space defined between at least two sides plates which are perpendicular to the axis of the shaft, the shaft extending through through-holes in said plates, an upper inner surface of each of the through-holes including a flat surface portion corresponding to an exterior shape of the shaft; and a lockup plate located in the bottomless space of the control lever, the lockup plate movable to force the shift lever upward toward an upper portion of the space and thereby cause the shift lever to contact closely the shaft and cause the shaft to contact closely the flat surface portions of the through-holes in the control lever.

2. A control lever fixing mechanism according to claim 1, wherein the hollow shaft also has a non-circular sectional-shaped portion of its inner surface.

3. A control lever fixing mechanism according to claim 2, wherein the non-circular sectional shaped portion of the inner surface of the shaft is complementary in shape to an upper portion of the outer surface of the shift lever, and upper right and left side surfaces of the outer surface of the shaft include symmetrical flat surface portions.

4. A control lever fixing mechanism according to claim 3, wherein the upper portion outer surface of the shift lever includes an upper flat surface, a lower right side flat surface and a lower left side flat surface.

5. A control lever fixing mechanism according to claim 1, wherein the upper surface of the lockup plate includes a threaded shaft extending upwardly and extending through a hole in the upper surface of the portion of the control lever which forms the bottomless space whereby the lockup plate is movable to shift the shift lever upward by screwing a nut on the portion of the threaded shaft which is outside of the control lever.

6. A control lever fixing mechanism according to claim 5, wherein the lockup plate comprises an annular body having the threaded shaft integral with an upper portion of the annular body.

7. A control lever fixing mechanism according to claim 6, wherein a bottom portion of the interior of the annular lockup plate contacts a bottom surface of the shift lever.

8. A control lever fixing mechanism according to claim 1, wherein an upper inner surface of each of the through-holes includes substantially symmetrical flat surface portions corresponding to the exterior shape of the shaft.

9. A control lever fixing mechanism comprising:

a shift lever whose base portion outer surface has a non-circular sectional shape;

a hollow shaft having a portion of its internal surface complementary in shape to the non-circular sectional shape of the outer surface of the shift lever fitted over a portion of the shift lever, and having a non-circular sectional shaped portion of its inner surface;

a control lever having a bottomless space defined between at least two side plates which are perpendicular to the axis of the shaft, the shaft extending through through-holes in said plates, an upper inner surface of each of the through-holes including a flat surface portion corresponding to an exterior shape of the shaft; and a lockup plate located in a bottomless space of the control lever, wherein said lockup plate comprises an annular body having a threaded shaft extend upwardly and through a hole in the upper surface of the portion of the control lever which forms the annular body, whereby the lockup plate is movable to shift a shift lever upward by screwing a nut on the portion of the threaded shaft which is outside of the control lever.

10. A control lever fixing mechanism according to claim 9, wherein a base portion of the shift lever is rotatably supported by a retainer with the shaft disposed therebetween, the retainer being mounted near a steering column by a shaft.

11. A control lever fixing mechanism according to claim 10, wherein a relatively large portion of an outer surface of the shaft is substantially cylindrical.

12. A control lever fixing mechanism according to claim 9, wherein the control lever is firmly attached to the shift lever by tightening the nut on the top of the threaded shaft of the lockup plate thereby allowing the control lever to rotate coaxially with the shift lever.

13. A control lever fixing mechanism according to claim 12, wherein a control cable is connected to a distal end of the control lever for a shift operation of an automatic transmission.

* * * * *